(No Model.)

G. F. KOLB.
SCREW DRIVER.

No. 324,121. Patented Aug. 11, 1885.

WITNESSES:
A. P. Grant,
W. F. Kircher

INVENTOR:
Geo. F. Kolb.
BY John A. Wiederscheim
ATTORNEY.

UNITED STATES PATENT OFFICE.

GEORGE F. KOLB, OF PHILADELPHIA, PENNSYLVANIA.

SCREW-DRIVER.

SPECIFICATION forming part of Letters Patent No. 324,121, dated August 11, 1885.

Application filed May 2, 1885. (No model.)

*To all whom it may concern:*

Be it known that I, GEORGE F. KOLB, a citizen of the United States, residing in the city and county of Philadelphia, State of Pennsylvania, have invented a new and useful Improvement in Screw-Drivers, which improvement is fully set forth in the following specification and accompanying drawings, in which—

Figure 1:
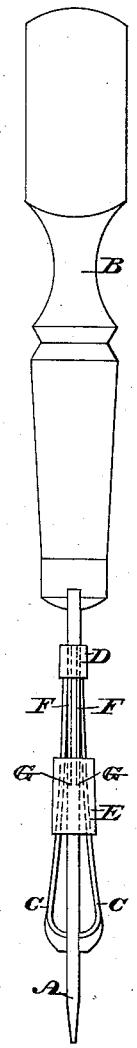
Figure 2:
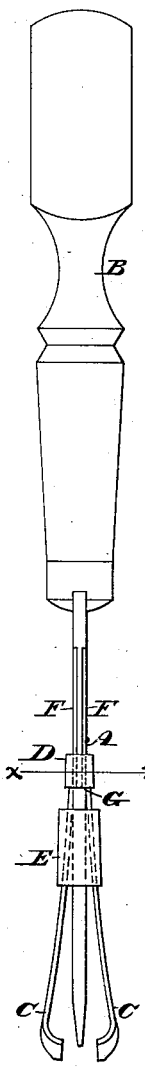
Figure 3:
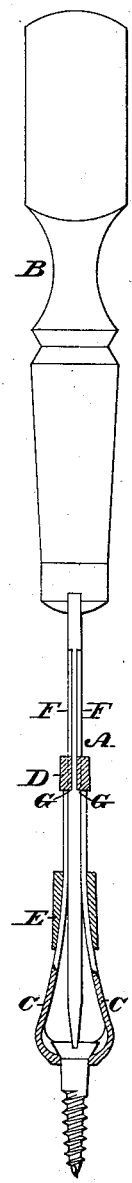
Figure 4:
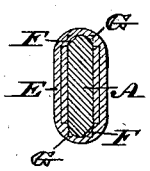

Figures 1 and 2 represent side elevations of a screw-driver embodying my invention. Fig. 3 represents a longitudinal section thereof. Fig. 4 represents a section in line $x$ $x$, Fig. 1, on an enlarged scale.

Similar letters of reference indicate corresponding parts in the several figures.

My invention consists of a screw-driver having jaws adapted to grasp a screw and hold the same during the operation of the driver in either direction.

Referring to the drawings, A represents the blade of a screw-driver, and B the handle thereof.

C represents two jaws, which are placed on opposite sides of the blade A, and connected with a sliding sleeve, D, which is fitted on the said blade, whereby by moving the jaws their ends may be placed in front or behind the end of the blade.

E represents a sleeve, which encircles the jaws C, and is adapted to slide thereon for the purpose of closing the jaws on the screw and holding them firmly thereagainst.

In order to limit the motion of the jaws in the direction toward the end of the blade, the edges of the blade for the portion traversed by the sleeve D are chamfered, as at F, the termination of the chamfers at the end toward the point of the blade forming shoulders G, against which the sleeve D is adapted to abut, thus preventing further outward motion of said sleeve, and consequently of the jaws.

The operation is as follows: When the jaws are in the position shown in Fig. 1, they are inoperative, being held against the blade by means of the sleeve E. By moving the sleeve E toward the sleeve D the jaws spring apart or expand, and may then be pushed out along the blade, so that their clamping ends are in advance of the end of the blade. The jaws are now placed over the shank of a screw and tightened thereagainst by moving the sleeve E forward, and the driver may be rotated, firmly clamping and steadying the screw until nearly driven home, when the sleeve E is withdrawn, whereby the jaws separate from the shank of the screw, and may then be restored to their normal position, thus permitting the final rotation of the screw to be performed by the screw-driver proper. After a screw has been fairly started by the driver, in order to remove or withdraw the same it may be grasped by the jaws, and thus entirely unscrewed, there being no liability of the driver to slip from the screw, owing to the clamping action of the jaws on said screw.

Having thus described my invention, what I claim as new, and desire to secure by Letters Patent, is—

1. A screw-driver provided with a blade of unequal thickness for a portion of its length, thereby forming shoulders G at a distance from the point of the blade a little less than the length of the jaws C, clamping-jaws C, connected to the sleeve D, and sleeve E, the said sleeve D being limited in its operation by said shoulders G, substantially as described.

2. A screw-driver provided with a clamping device consisting of jaws connected with a sleeve which slides on the blade, and a tightening-sleeve which tightens on the jaws, the blade having shoulders at a distance from the point thereof a little less than the length of the said jaws, for limiting the forward motions of said jaws, substantially as and for the purpose set forth.

GEORGE F. KOLB.

Witnesses:
JOHN A. WIEDERSHEIM,
A. P. GRANT.